(12) United States Patent
Jin et al.

(10) Patent No.: US 8,176,529 B2
(45) Date of Patent: May 8, 2012

(54) APPARATUS AND METHOD FOR CONTROLLING DEVICES IN ONE OR MORE HOME NETWORKS

(75) Inventors: Ho Jin, Yongin-si (KR); Jong-wook Park, Gangnam-gu (KR); Seung-hun Jeon, Seocho-gu (KR); Young-chul Sohn, Gangnam-gu (KR); Myoung-soon Choi, Suwon-si (KR); Hyok-sung Choi, Yongin-si (KR); Seong-kook Shin, Seocho-gu (KR); Hae-sik Jun, Gwanak-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1489 days.

(21) Appl. No.: 11/650,521

(22) Filed: Jan. 8, 2007

(65) Prior Publication Data

US 2007/0271595 A1    Nov. 22, 2007

(30) Foreign Application Priority Data

May 19, 2006  (KR) .................. 10-2006-0045274

(51) Int. Cl.
*H04L 29/06* (2006.01)
(52) U.S. Cl. ................. 726/3; 726/7; 709/223; 709/224
(58) Field of Classification Search ................. 726/3, 7; 709/223, 224, 228, 238
See application file for complete search history.

(56) References Cited

U.S. PATENT DOCUMENTS

| | | | |
|---|---|---|---|
| 6,735,619 B1 | 5/2004 | Sawada | |
| 6,924,727 B2 * | 8/2005 | Nagaoka et al. | 340/3.1 |
| 2003/0061380 A1 * | 3/2003 | Saito et al. | 709/238 |
| 2003/0217136 A1 * | 11/2003 | Cho et al. | 709/223 |
| 2004/0078573 A1 * | 4/2004 | Matsuyama | 713/175 |
| 2004/0133704 A1 * | 7/2004 | Krzyzanowski et al. | 709/250 |
| 2006/0031459 A1 * | 2/2006 | Ahn et al. | 709/224 |
| 2006/0143295 A1 * | 6/2006 | Costa-Requena et al. | 709/227 |
| 2006/0155984 A1 | 7/2006 | Tsuchida | |

FOREIGN PATENT DOCUMENTS

| | | |
|---|---|---|
| CN | 1685689 A | 10/2005 |
| CN | 1732654 A | 2/2006 |
| JP | 2005-130307 A | 5/2005 |
| KR | 10-2004-0049665 A | 6/2004 |
| KR | 10-0455123 B1 | 10/2004 |
| WO | WO 2004032452 A1 * | 4/2004 |
| WO | WO 2004051948 A1 * | 6/2004 |

OTHER PUBLICATIONS

Amjad, Arif. "FAQ." jGuru: What is event polling?. Dec. 9, 2000. jGuru. <http://www.jguru.com/faq/view.jsp?EID=267203>.*

* cited by examiner

*Primary Examiner* — Kambiz Zand
*Assistant Examiner* — Imhotep Durham
(74) *Attorney, Agent, or Firm* — Sughrue Mion, PLLC

(57) ABSTRACT

An apparatus for controlling devices in one or more home networks is provided. The apparatus includes an authentication unit, a control message generation unit, a control message transmission unit, a response message reception unit, and an information management unit. The authentication unit performs authentication with one or more relay devices each connected to a plurality of devices through a network. The control message generation unit generates a control message in response to a user input. The control message transmission unit transmits the generated control message to a device selected by the user from among the plurality of devices. The response message reception unit receives a response message responding to the transmitted control message. The information management unit manages information about the relay devices and the plurality of devices.

24 Claims, 13 Drawing Sheets

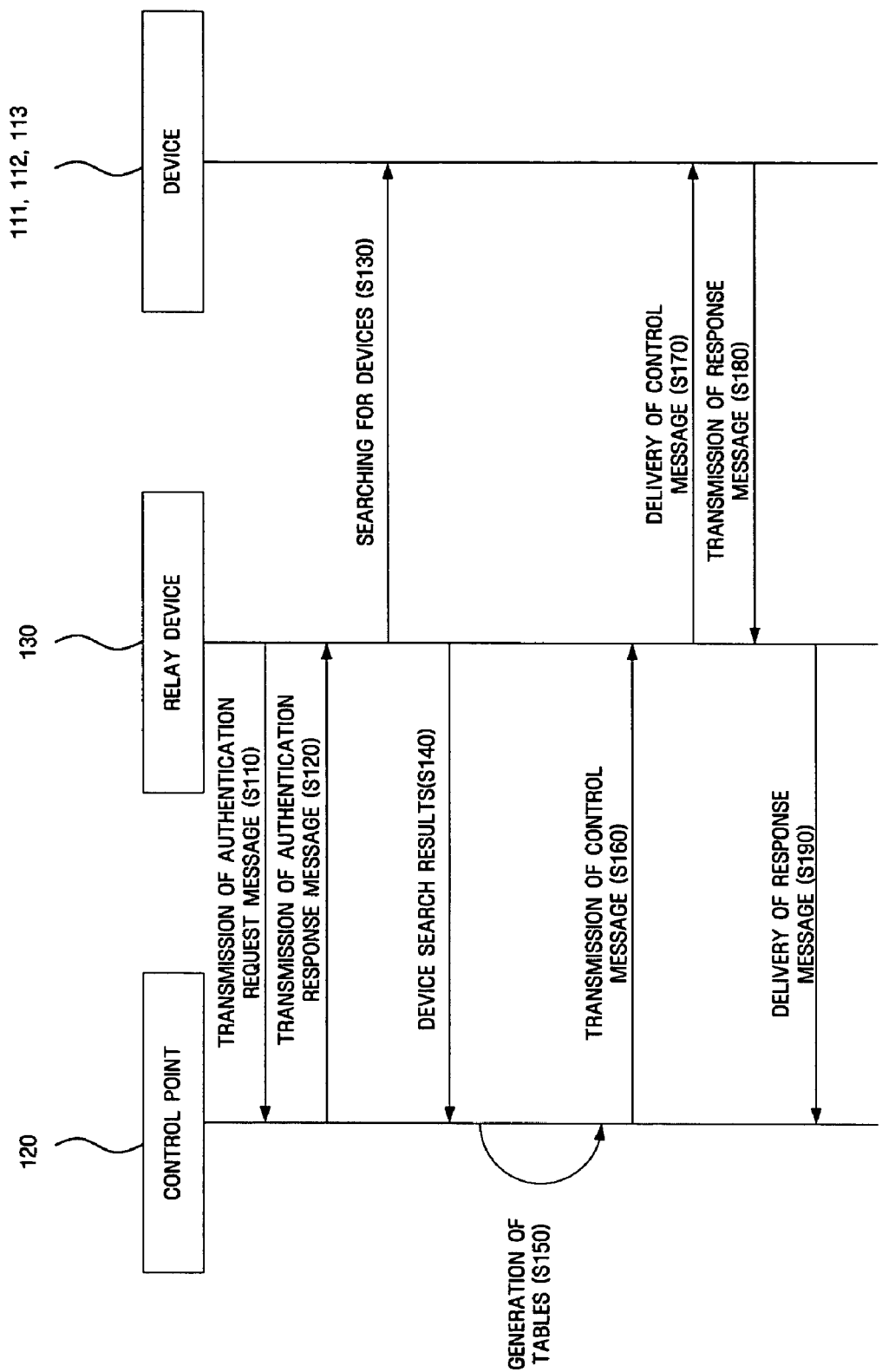

FIG. 8

POST * HTTP/1.1
Host: 192.10.10.1
Content- type: text/plain
Content- length:196

Notify: Authentication
Host: 192.10.10.1
Upnphost: 10.10.10.1
DeviceID : 00.0F.00.29.04.21
Manufacture: Samsung
Model: PhotoPlayer-IGD
ModelNum SVP-07
DeviceType DMP
Firmware Version: Samsung-SPL-07-SPR5

FIG. 9

HTTP/1/1 200 OK
Content-type: text/plain
Content-length:183

Notify: Authentication
Authentication: OK
ServiceURL: 192.10.10.1/servlet/clsHttpSvl
InitServiceID: 5678
InitServiceKey: 00.0F.00.29.04.21
FirmwareUpdateURL: 192.10.10.1/servlet/FirmUpdate

FIG. 10

POST * HTTP/1.1
Host: 192.10.10.1
Content- type: text/plain
Content- length:252

NOTIFY * HTTP/1.1
HOST: 239.255.255.250:1900
CACHE- CONTROL: max- age = *seconds until advertisement expires*
LOCATION: *URL for UPnP description for root device*
NT: *search target*
NTS: ssdp:alive
SERVER: *OS/version* UPnP/1.0 *product/version*
USN: *advertisement UUID*

FIG. 11

POST * HTTP/1.1
Host: 192.10.10.1
Content - type: text/plain
Content - length:100

NOTIFY * HTTP/1.1
HOST: 239.255.255.250 :1900
NT: *search target*
NTS : ssdp:byebye
USN: *advertisement UUID*

FIG. 12

HTTP/1/1 200 OK
Content-type: text/plain
Content-length:26

Notify: SSDP
SDDP-alive: OK

FIG. 14

POST * HTTP/1.1
Host: 192.10.10.1
Content-type: text/plain
Content-length:61

Notify:Poll
InitServiceID:5678
InitServiceKey:00.0F.00.29.04.21

FIG. 15

HTTP/1/1 200 OK
Content-type: text/plain
Content-length:522

POST /AlbumManager/control HTTP/1.1
SOAPAcTON: "urn:schemas-upnp-org:service:AlbumManager:1#SetListURI"
HOST:10.10.10.2:50135
CONTENT-TYPE:text/xml;charset="utf-8"
Content-Length:357

<?XML version="1.0"encoding="utf-8"?>
<s:Envelope s:encodingStyle="http://schemas.xmlsoap.org/soap/encoding/"
      xmlns:s="http://schemas.xmlsoap.org/soap/envelope/" >
<s:Body>
<u:SetListURI xmlns:u="urn:schemas-upnp-org:service:AlbumManager:1" >
<NewURI>http://222.122.8.158/allpot/L595720051214100044.pvm</NewURI>
</u:SetListURI>
</s:Body>
</s:Envelope>

FIG. 16

HTTP/1/1 200 OK
Content-type: text/plain
Content-length:111

M-SEARCH * HTTP/1.1
HOST: 239.255.255.250:1900
MAN: "ssdp:discover"
MX: *seconds to delay response*
ST: *search target*

FIG. 17

POST * HTTP/1.1
Host: 192.10.10.1
Content-type: text/plain
Content-length:246

HTTP/1.1 200 OK
CACHE -CONTROL: max -age = *seconds until advertisement expires*
DATE: *When response was generated*
EXT:
LOCATION: *URL for UPnP description for root device*
SERVER: *OS/version*UPnP/1.0 *product/version*
ST: *search target*
USN: *advertisement UUID*

APPARATUS AND METHOD FOR CONTROLLING DEVICES IN ONE OR MORE HOME NETWORKS

CROSS-REFERENCE TO RELATED APPLICATION

This application claims priority from Korean Patent Application No. 10-2006-0045274 filed on May 19, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to controlling devices in home networks and, more particularly, to an apparatus and method for controlling devices in one or more home networks.

2. Description of the Related Art

Recently, with the development of communication and network technology, various types of home networks have been developed, and various technologies for improving user convenience when controlling and monitoring many devices which constitute a home network have been proposed. Representative examples of such technologies include Universal I Plug and Play (UPnP), Digital Living Network Alliance (DLNA) and the like.

Among them, UPnP provides a zero-configuration Plug and Play function that does not require user settings, so that a device automatically participates in a network, and dynamically acquires an Internet Protocol (IP) address, delivers functions, and identifies the presence and functions of other devices.

Meanwhile, as more homes and companies purchase additional computers, networking is recognized as a powerful means for sharing computer resources. Internet gateways are used to share Internet connections and to enable homes and companies to easily and inexpensively manage a network. Internet gateways provide Network Address Translation (NAT) as a means for connecting several hosts which share a common IP address with each other.

NAT is an Internet Engineering Task Force (IETF) standard that is used to enable several PCs and apparatuses to share a single globally routable Internet Protocol version 4 (IPv4) address in a personal network (which uses the range of a personal address such as 10.0.x.x, 192.168.x.x or 172.x.x.x). The main reason why NAT is frequently used is that there are insufficient IPv4 addresses. NAT is used for sharing an Internet connection in Microsoft Windows XP and Windows Me and other many Internet gateway devices. In particular, NAT is used for sharing a high-speed network through Digital Subscriber Lines (DSLs).

FIG. 1 is a diagram illustrating a home network using a general NAT device.

As illustrated in FIG. 1, the home network using a general NAT device includes a plurality of clients 11, 12 and 13, a NAT device 21 and a server 31.

In this case, when any one client 11 transmits a packet to the server 31, the corresponding client 11 transmits the packet, which includes a source IP address, a destination IP address, a source port, a destination port and a network protocol, to a gateway. In FIG. 1, the gateway may be understood to be the NAT device 21.

The NAT device 21 intercepts the packet delivered from the corresponding client 11 and makes a port mapping table using the destination IP address, the destination port, the external IP address of the NAT device 21, an external port, a network protocol and an internal IP address and port.

In other words, as illustrated in FIG. 2, the NAT device 21 performs conversion on the packet delivered from the corresponding client 11 through the port mapping table, and delivers it to the server 31.

In contrast, when the server 31 delivers a packet to the clients 11, 12, and 13, the NAT device 21 receives the packet from the server 31, compares the received packet with the port mapping table, and performs inverse conversion on the packet, unlike the case in which the client 11 delivers a packet to the server 31, as described with reference to FIG. 2.

However, in the case of the above-described network of FIG. 1 which uses an NAT device, the NAT device 21 must support UPnP, which was defined by the Internet Gateway Device Working Committee of UPnP Forum and, thus, UPnP Traversal, and it is difficult to apply it to a network in which a plurality of NATs are used.

Korean Unexamined Patent Publication No. 2004-39039 discloses a control message multicast method and apparatus for a UPnP-based network system, which includes SOAP/HTTPMU/UDP in UPnP device architecture version 1.0 and can transmit the same control message to a plurality of devices which exist in a UPnP network. However, the method and apparatus are related to the elimination of inconvenience in the transmission of the same control message to each device through one to one communication, and have problems in that the NAT apparatus must support UPnP and, thus, UPnP Traversal, and it is difficult to apply them to a network in which a plurality of NATs are used.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for controlling devices in one or more home networks, which can easily control the devices connected to the home networks through one or more devices which perform a relay between the devices and an external source, and allow the devices to be easily accessed through the relay devices even if it is difficult to access the home networks.

According to an aspect of the present invention, there is provided an apparatus for controlling devices in one or more home networks, the apparatus including an authentication unit which performs authentication with one or more relay devices, each connected to a plurality of devices through a network, a control message generation unit which generates a control message in response to a user input, a control message transmission unit which transmits the generated control message to a device selected by the user from among the plurality of devices in the home network, a response message reception unit which receives a response message responding to the transmitted control message, and an information management unit which manages information about the relay devices and the devices in the home network.

According to another aspect of the present invention, there is provided an apparatus for controlling devices in one or more home networks, the apparatus including a connection state detection unit which detects connection states of a plurality of devices connected through a network, an authentication unit which performs authentication with a control device which controls the devices, and a message delivery unit which delivers messages transmitted and received between the control unit and the devices.

According to another aspect of the present invention, there is provided a method of controlling devices in one or more home networks, the method including performing authentication with one or more relay devices connected to a plurality of devices through a network, generating a control message according to a user input, transmitting the generated control message to a device selected by the user from among the plurality of devices, receiving a response message responding to the transmitted control message and managing information about the relay devices and the devices.

According to another aspect of the present invention, there is provided a method of controlling devices in one or more home networks, the method including detecting connection states of the devices connected through a network, performing authentication with a control device which controls the plurality of devices, and delivering messages transmitted and received between the control unit and the devices.

BRIEF DESCRIPTION OF THE DRAWINGS

The above and other aspects of the present invention will be more clearly understood from the following detailed description of exemplary embodiments taken in conjunction with the accompanying drawings, in which:

FIG. 7 is a diagram illustrating a method of controlling devices in a home network according to an exemplary embodiment of the present invention;

FIG. 8 is a diagram illustrating an authentication request message according to an exemplary embodiment of the present invention;

FIG. 9 is a diagram illustrating an authentication response message according to an exemplary embodiment of the present invention;

FIG. 10 is a diagram illustrating search results to be transmitted to the control point when a device exists in the home network according to an exemplary embodiment of the present invention;

FIG. 11 is a diagram illustrating search results to be transmitted to the control point when a device is removed from the home network according to an exemplary embodiment of the present invention;

FIG. 12 is a diagram illustrating a response message which is transmitted by the control point according to an exemplary embodiment of the present invention transmits based on the search results;

FIG. 14 is a diagram illustrating a polling message according to an exemplary embodiment of the present invention;

FIG. 15 is a diagram illustrating a control message transmitted to the relay device by the control point in response to the polling message of FIG. 14;

FIG. 16 is a diagram illustrating a search request message requesting searching for devices to the relay device when the control point according to an exemplary embodiment of the present invention receives the polling message; and FIG. 17 is a diagram illustrating a search result message transmitted to the control point by the relay device according to the search request message of FIG. 16.

DESCRIPTION OF THE EXEMPLARY EMBODIMENTS OF THE INVENTION

Figure 1:
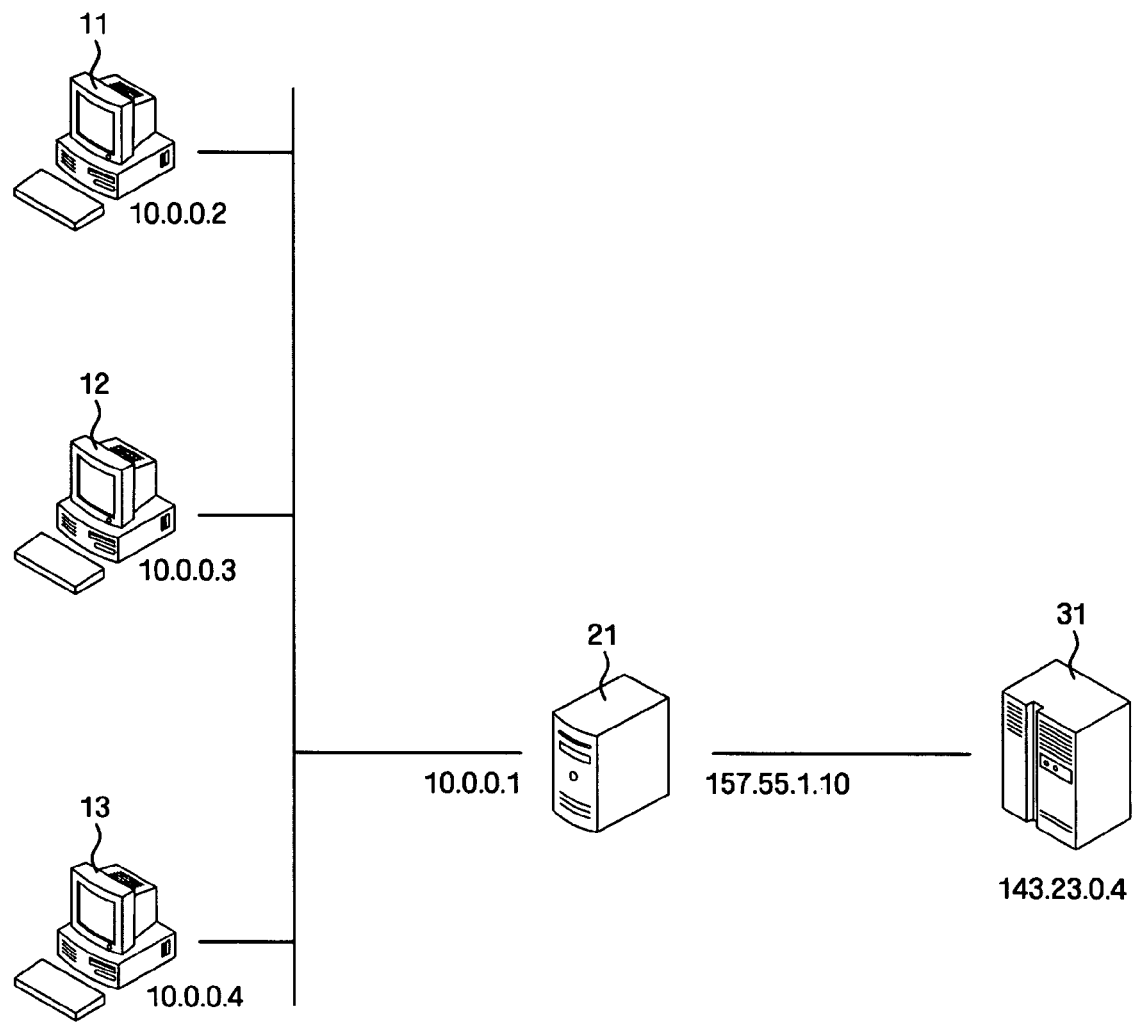
FIG. 1 is a diagram illustrating a home network using a general NAT device.
Figure 2:
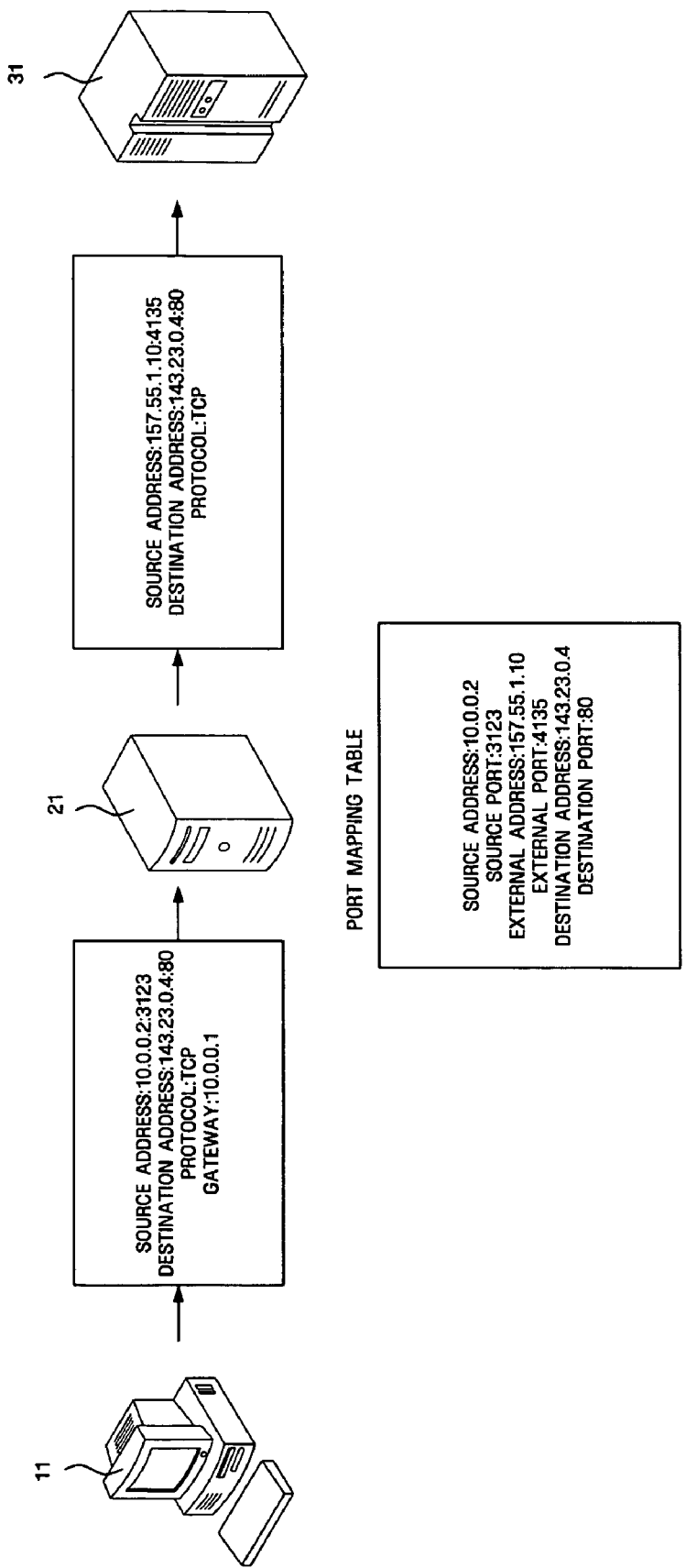
FIG. 2 is a diagram illustrating a general port mapping table.

Reference now should be made to the drawings, in which the same reference numerals are used throughout the different drawings to designate the same or similar components.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 3:
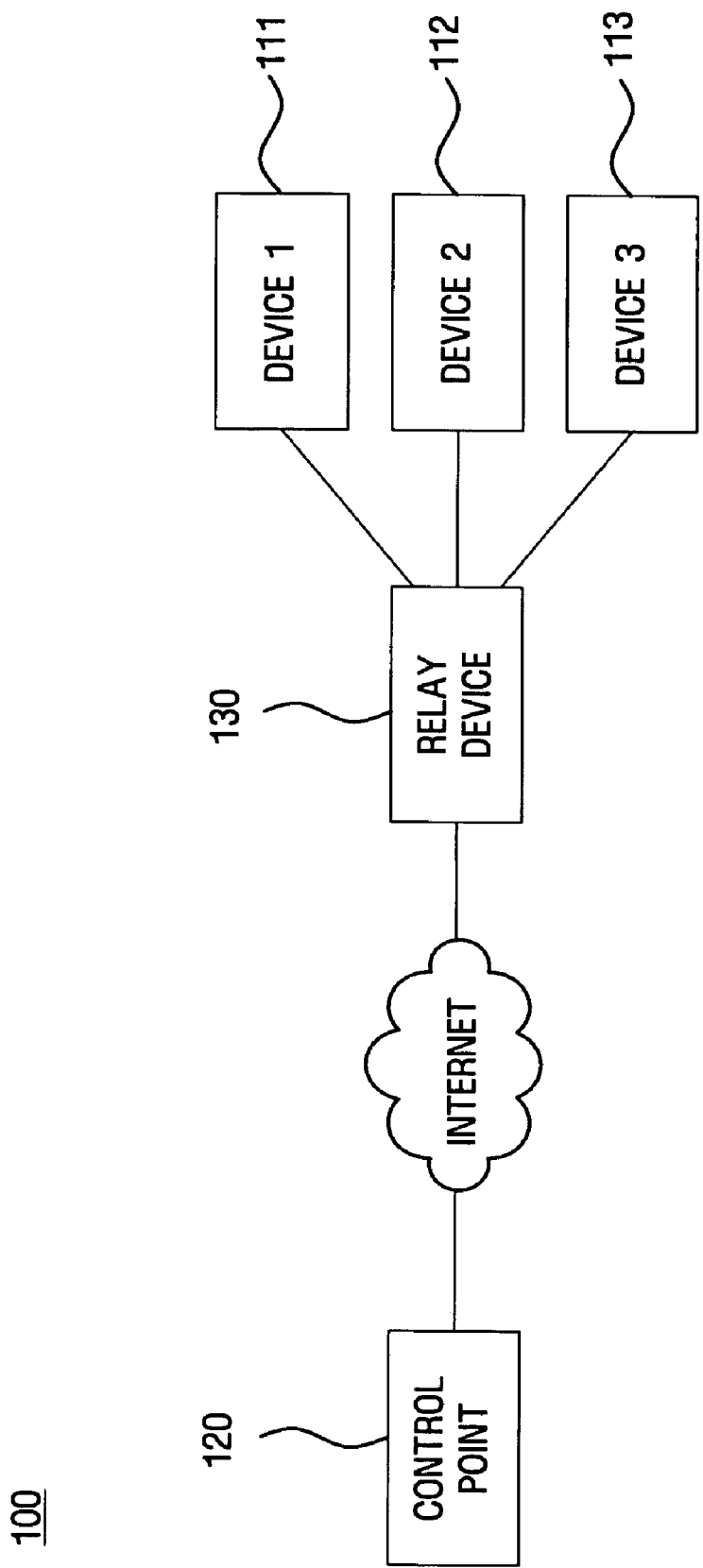
FIG. 3 is a diagram illustrating a home network according to an exemplary embodiment of the present invention.

FIG. 3 is a diagram illustrating a home network system according to an exemplary embodiment of the present invention.

As illustrated, the network system 100 according to the exemplary embodiment of the present invention may include a plurality of devices 111, 112 and 113 which provide predetermined services, a control point 120 which transmits control messages for the control of the plurality of devices 111, 112 and 113, and receives response messages responding from the plurality of devices 111, 112 and 113, and a relay device 130 which relays the transmission and reception of messages between the plurality of devices 111, 112 and 113 and the control point 120 and delivers information about the connection states of the plurality of devices 111, 112 and 113 to the control point 120. In this exemplary embodiment, a network which consists of the plurality of devices 111, 112 and 113 and the relay device 130 connected to the plurality of devices 111, 112 and 113 is called an "internal network".

Furthermore, in this exemplary embodiment of the present invention, the plurality of devices 111, 112 and 113 may be understood to be apparatuses, such as an appliance, a Personal Computer (PC), a wireless communication apparatus, or the like, capable of providing various services including video, music, or imaging, connected to each other through the relay device 130 in a specific location, UPnP, DLNA, etc. In this exemplary embodiment, the case in which the internal network is constructed based on UPnP is taken as an example.

The control point 120 is understood to be a web server that is connected with the relay device 130 through the Internet, etc., transmits control messages to the plurality of devices 111, 112 and 113 connected to the delay device 130, and receives messages from the plurality of devices 111, 112 and 113.

Figure 4:
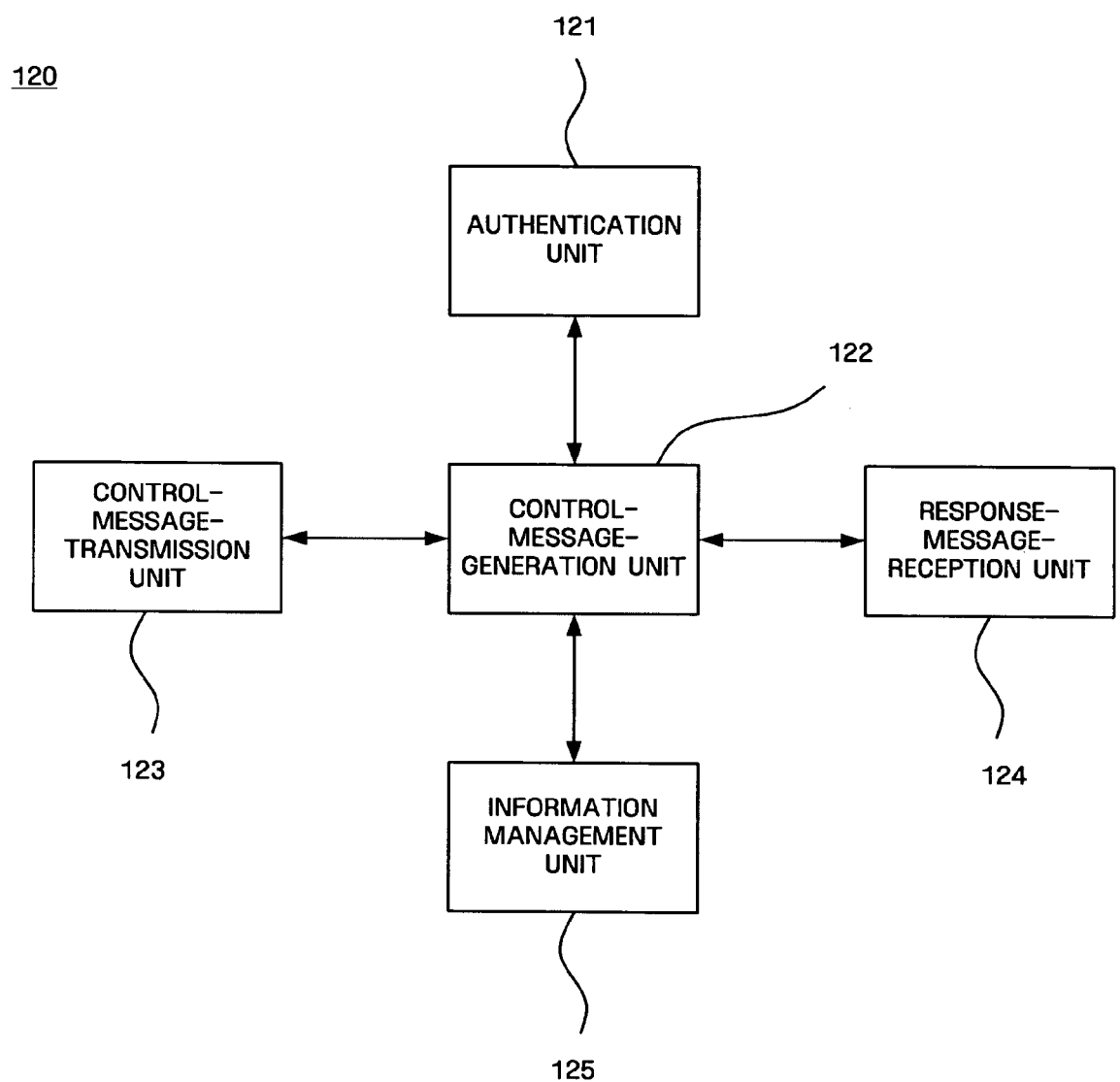
FIG. 4 is a diagram illustrating a control point according to an exemplary embodiment of the present invention.

FIG. 4 is a diagram illustrating a control point according to an exemplary embodiment of the present invention.

As illustrated in FIG. 4, the control point 120 according to an exemplary embodiment of the present invention may include an authentication unit 121 which achieves a connection to the relay device 120 through a predetermined authentication process, a control message generation unit 122 which generates control messages capable of controlling the plurality of devices 111, 112 and 113 in response to an input from a user, a control message transmission unit 123 which transmits the generated control messages to the relay device 130, a response message reception unit 124 which receives response messages responding to the transmitted control messages, and an information management unit 125 which manages information about the relay device 130 and the plurality of devices 111, 112 and 113 connected to the relay device 130.

The authentication unit 121 performs authentication with the relay device 130 through an authentication request message transmitted from the relay device 130. In this case, details included in the authentication request message transmitted by the relay device 130 may include a message type (for example, Authentication or Polling), the URL of the control point 120 (for example, 192.0.0.1 etc.), the UPnP IP (for example, 10.10.10.1 etc.), the device ID of the relay device 130 (for example, 00.0F.00.29.04.21 etc.), the name of the manufacturer of the relay device 130, the model No. and model name of the relay device 130, the type of the relay device 130 and the firmware version of the relay device 130, as seen in Table 1.

TABLE 1

| Details | Description |
| --- | --- |
| Notify | message type |
| Host | URL of control point |
| UPnPHost | IP & Port of relay device |
| Uuid | UUID of relay device |
| DeviceID | ID of relay device(IP/MAC Address) |
| Manufacturer | manufacturer name |
| Model | model name |
| ModelNum | model No. |
| DeviceType | device type |
| FirmwareVer | firmware version |

In Table 1, the respective details are only examples to promote the understanding of the exemplary embodiments of the present invention, and the details included in Table 1 and the authentication request message may be deleted or modified, or other details may be added thereto.

The control message generation unit 122 can generate a control message capable of controlling a predetermined device, which a user wants to control, in response to an input from the user, and the control message transmission unit 123 can transmit the generated control message to the relay device 130 when the authentication by the authentication unit 121 has been completed.

The response message reception unit 124 can receive a message in response to the control message transmitted by the control message transmission unit 123, and can display the received response message through a predetermined display device equipped with the control point 120. Therefore, the user can be aware of the results of control based on the control message through the displayed response message.

The information management unit 125 can generate a predetermined table using information about the relay device 130 and the plurality of devices 111, 112 and 113 connected to the relay device 130, which is transmitted from the relay device 130 therein, and then store it. The stored table has the form of Table 2.

TABLE 2

| IP address of relay device | IP address of device |
| --- | --- |
| 192.10.10.20 | IP address of device 1 |
|  | IP address of device 2 |
|  | IP address of device 3 |

In this case, Table 2 is an example of the case of generating a table using the IP addresses of device 1, device 2 and device 3 (111, 112 and 113) connected to the relay device having the IP address of 192.10.10.20 and managing it.

Although, in FIG. 3, the case in which there is one relay device 130 is described, the information management unit 125 may generate a table for each relay device using information about devices connected to the relay device in the case where two or more relay devices exist.

Figure 5:
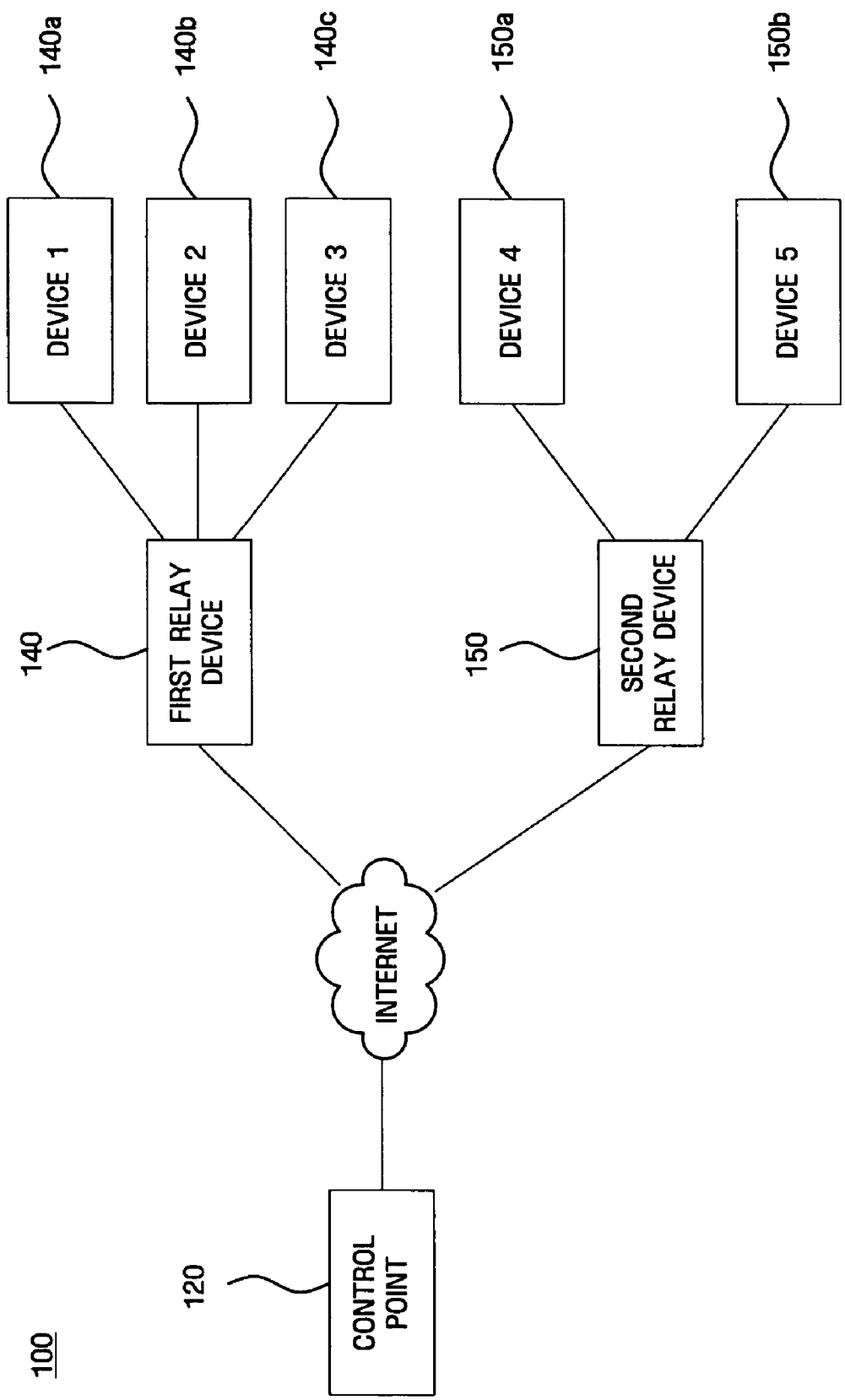
FIG. 5 is a diagram illustrating a table managed by an information management unit according to an exemplary embodiment of the present invention.

When the information management unit 125 is connected through the Internet to a first relay device 140 and a second relay device 150 which have different IP addresses, and device 1 140*a*, device 2 140*b* and device 3 140*c* are connected to the first relay device 140, and device 4 150*a* and device 5 150*b* are connected to the second relay device 150, as shown in FIG. 5, the information management unit 125 classifies the first relay device 140 and the second relay device 150 based on their IP addresses, and generates a table which includes the IP addresses of devices connected to a corresponding relay device based on the separated IP addresses, as in the following Table 3.

TABLE 3

| IP address of relay device | IP address of device |
| --- | --- |
| 192.10.10.20 | IP address of device 1 |
|  | IP address of device 2 |
|  | IP address of device 3 |
| 192.10.10.30 | IP address of device 4 |
|  | IP address of device 5 |

Although, in the above-described Tables 2 and 3, the case in which a table is generated using the IP address of a relay device and the IP addresses of devices in the home network and is managed is described as an example, this is an example to aid in understanding of the exemplary embodiments of the present invention, so the exemplary embodiments of the present invention are not limited to this, and the table may be generated using various details, such as a MAC address, and may be managed.

In this case, each of the first relay device 140 and the second relay device 150 of FIG. 5 described above can be understood to be an element identical to the relay device 130 of FIG. 3 described above. Therefore, each of the first relay device 140 and the second relay device 150 may include components that are identical to those of the relay device 130 of FIG. 3 described above.

Figure 6:
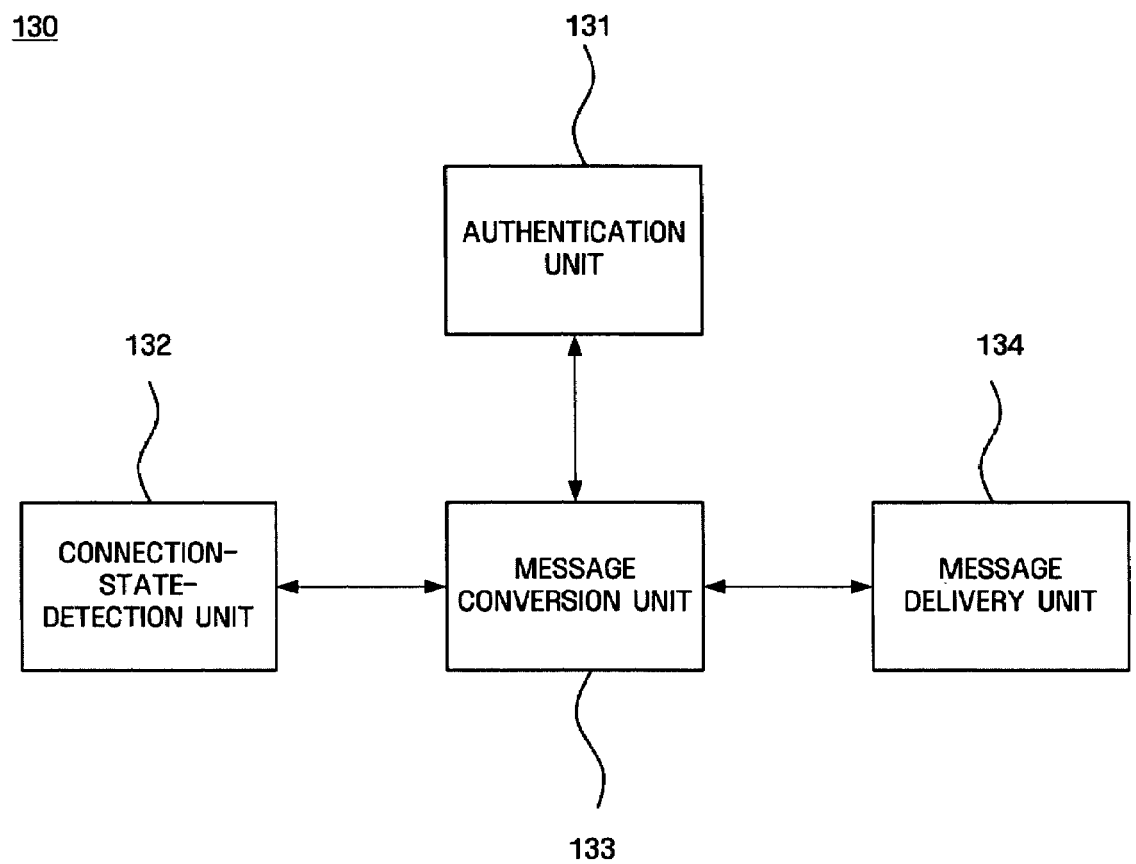
FIG. 6 is a diagram illustrating a relay device according to an exemplary embodiment of the present invention.

FIG. 6 is a diagram illustrating a relay device according to an exemplary embodiment of the present invention.

As illustrated, the relay device 130 according to an exemplary embodiment of the present invention may include an authentication unit 131 which achieves a connection through authentication with the control point 120, a connection state detection unit 132 which detects the connection states of a plurality of devices 111, 112, and 113 connected to an internal network, a message conversion unit 133 which converts messages transmitted and received between the control point 120 and the plurality of devices 111, 112 and 113, and a message delivery unit 134 which delivers the converted messages to the control point 120 and the plurality of devices 111, 112 and 113.

The authentication unit 131 can perform authentication with the above-described authentication unit 121 of the control point 120. In this case, the authentication unit 131 can transmit an authentication request message based on Table 1, described above, to the control point 120, and complete the authentication by receiving an authentication response message in response to the transmitted authentication request message.

The connection state detection unit 132 can detect the connection states of the plurality of devices 111, 112 and 113 connected to the relay device 130 through an internal network. For example, the connection state detection unit 132 can detect the addition or removal of a predetermined device, and then transmit this information to the control point 120. In this case, the control point 120 can update a table stored in the information management unit 125 with the transmitted connection states.

Meanwhile, the connection states detected by the connection state detection unit 132 can be transmitted to the control point 120 when authentication with the control point 120 is performed by the authentication unit 131. When the connection state is changed in a state maintaining the connection, a corresponding changed content can be transmitted to the control point 120. Therefore, the information management unit 125 of the control point 120 can generate a table using information about connection states transmitted upon authentication, and can update the table with the changed content transmitted when the connection of the relay device 130 is maintained.

The message conversion unit 133 can perform the conversion of messages transmitted and received between the control point 120 and the plurality of devices 111, 112 and 113. The conversion of messages can be performed by a NAT device which provides UPnP support defined in the Internet Gateway Device Working Committee of UPnP Forum, and, in an exemplary embodiment of the present invention, the relay device 130 is understood as performing the role of the NAT device. Furthermore, details about UPnP are disclosed in http://www.upnp.org, and thus a detail description thereof is omitted herein.

The message delivery unit 134 can be aware of the control messages and response messages delivered between the control point 120 and the plurality of devices 111, 112 and 113, extract the body of the messages therefrom, and then deliver the body of the messages to the control point 120 and the plurality of devices 111, 112 and 113.

FIG. 7 is a diagram illustrating a method of controlling the devices of one or more home networks according to an exemplary embodiment of the present invention.

As illustrated in FIG. 7, in the method of controlling the devices of one or more home networks, first, the relay device 130 transmits an authentication request message to the control point 120 at operation S110. In this case, the authentication request message transmitted from the relay device 130 to the control point 120 may include respective details included in the above described Table 1. FIG. 8 is a diagram illustrating an example of the authentication request message transmitted from the relay device 130.

The control point 120 transmits an authentication response message to the relay device 130 in response to the authentication request message transmitted by the relay device 130, thereby completing the authentication process at operation S120. In this case, the authentication response message transmitted by the control point 120 may include details, such as the URL of the control point 120 and FirmwareUpdateURL, as illustrated in FIG. 9, but the exemplary embodiment of the present invention is not limited to them.

After having performed authentication with the control point 120, the relay device 130 searches for devices connected via an internal network at operation S130.

The relay device 130 transmits search results for the devices to the control point 120 at operation S140. In this exemplary embodiment of the present invention, the search results transmitted to the control point 120 are described in the case where a predetermined device exists in the internal network or in the case where the predetermined device is removed therefrom as an example. FIG. 10 is a diagram illustrating an example of search results when there is a predetermined device, and FIG. 11 can be understood to be search results transmitted to the control point 120 when a predetermined device is removed from the internal network.

Furthermore, when receiving the search results as in the above-described FIGS. 10 and 11, the control point 120 can transmit a response message, such as a message illustrated in FIG. 12, to the relay device 130. In this case, FIG. 12 can be understood to be a response message in the case where a predetermined device is found in the internal network.

The control point 120 can generate a table in the information management unit 125 based on the search results transmitted from the relay device 130, and, if a pre-generated table exists, can update the existing table at operation S150.

Upon input from a user, the control point 120 generates a control message in response thereto, and transmits the generated control message to the relay device 130 at operation S160. In this case, the control point 120 generates a control message through the control message generation unit 123. The generated control message may include a source address, which is the address of the control point 120, a destination address, which is the address of the relay device 130, and the address of a corresponding device, which a user desires to control, based on the above-described Tables 2 and 3.

When the message conversion unit 133 performs the conversion of the transmitted control message, the relay device 130 then transmits the converted control message to a corresponding device at operation S170. In order words, the relay device 130 can extract the body of a message from the control message transmitted from the control point 120 based on the device address included in the control message transmitted from the control point 120, and can transmit it to a corresponding device.

The device that receives the control message generates a predetermined response message and then transmits it to the relay device 130 at operation S180. In this case, the relay device 130 converts the transmitted response message and then transmits it to the control point 120 at operation S190. At this time, the relay device 130 extracts the body of the message from the response message transmitted from the corresponding device and transmits it to the control point 120.

Meanwhile, if the control point 120 and the relay device 130 according to an exemplary embodiment of the present invention have completed authentication, but the control point 120 cannot access the relay device 130 for any reason, for example, a security breach, the relay device 130 can transmit a polling message to the control point 120 at predetermined time intervals. In this case, when it receives the polling message from the relay device 130, the control point 120 can transmit a control message, which is generated and stored until the polling message is received, to the relay device 130. In an exemplary embodiment of the present invention, the case where the control message is transmitted when the polling message is received in the control point 120 is described as an example, but the present invention is not limited to this, and can perform various functions such as searching for predetermined devices.

Figure 13:
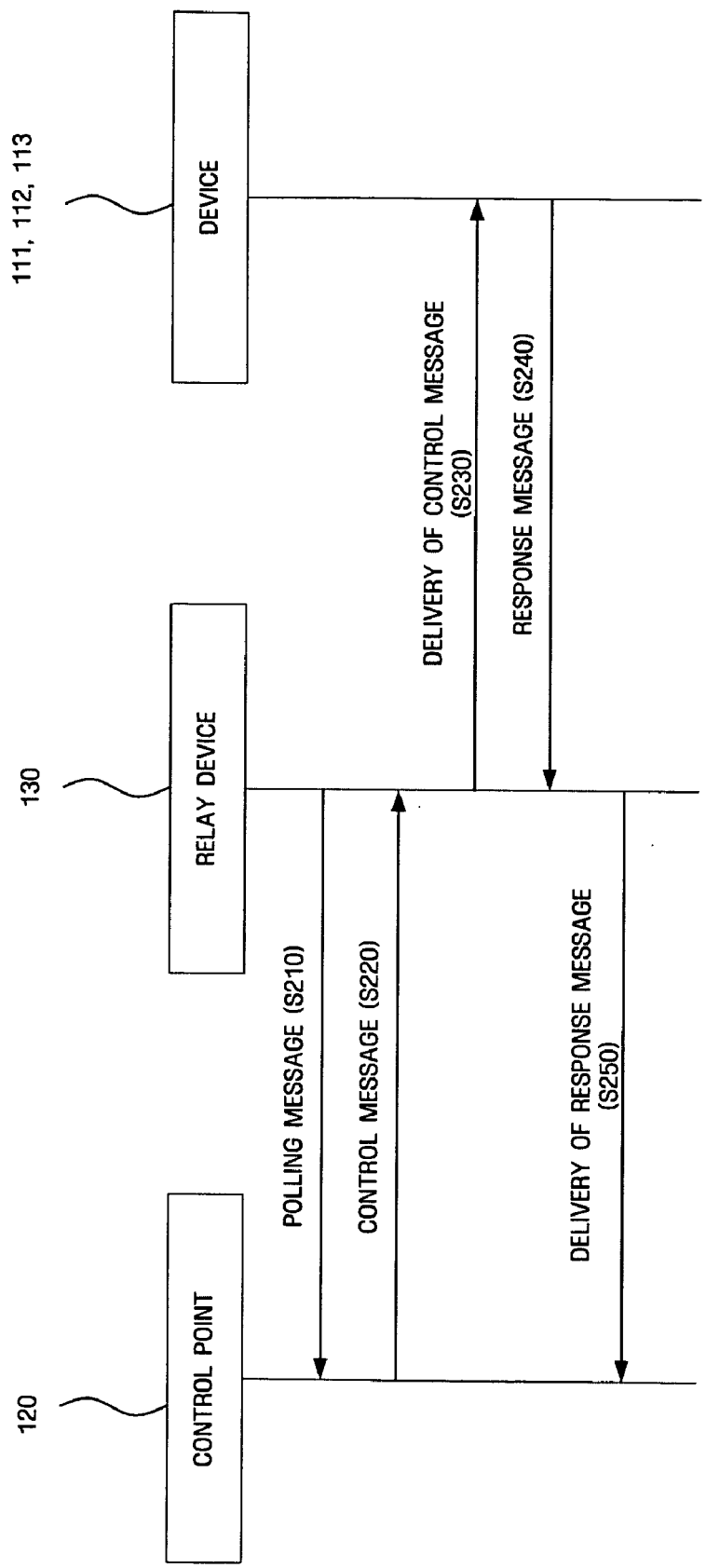
FIG. 13 is a diagram illustrating the polling method of the relay device according to an exemplary embodiment of the present invention.

FIG. 13 is a diagram illustrating the polling method of a relay device according to an exemplary embodiment of the present invention.

As illustrated, in the polling method of a relay device according to an exemplary embodiment of the present invention, first, the relay device 130 transmits a polling message, as illustrated in FIG. 14, to the control point 120 at predetermined time intervals based on a product design or user settings at operation S210.

The control point 120 generates and stores a control message in response to input from a user until the polling message is transmitted from the relay device 130, and transmits the stored control message, such as that illustrated in FIG. 15, to the relay device 130 at operation S220. Furthermore, the control point 120 can perform not only the transmission of the control message but also searching for predetermined devices when the polling message is received.

For example, when the polling message is received from the relay device 130, the control point 120 can transmit a search request message, such as that illustrated in FIG. 16, to the relay device 130, requesting a search for devices connected to the relay device 130, and the relay device 130 can transmit device search results, such as that is illustrated in FIG. 17, to the control point 120.

The relay device 130 delivers the control message transmitted from the control point 120 to a corresponding device, and the corresponding device transmits a response message to the relay device 130 at operation S240.

The relay device 130 transmits the response message transmitted from the corresponding device to the control point 120 at operation S250.

The term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and may be configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units, or may be further separated into additional components and units.

According to the above-described apparatus and method for controlling devices in one or more home networks, messages transmitted and received between a control point and the devices of the home network are delivered through a relay device, and the control point can access the devices of the home network through polling in the relay device even if it is difficult to access the home networks, so that there is an advantage in that the control point can be provided with various services from the devices of the home network.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling devices in one or more home networks, the apparatus comprising:
   an authentication unit which performs authentication with a plurality of relay devices, each of the relay devices being connected to a plurality of devices through a network;
   a control message generation unit which generates a control message in response to an input;
   a control message transmission unit which transmits the control message to a device selected from among the plurality of devices;
   a response message reception unit which receives a response message responding to the control message; and
   an information management unit which manages information about the relay devices and the devices.

2. The apparatus of claim 1, wherein the authentication unit receives an authentication request message from a relay device of the relay devices and transmits an authentication response message responding to the authentication request message to the relay device.

3. The apparatus of claim 1, wherein the information management unit generates a table which lists the devices connected to the relay devices for each of the relay devices.

4. The apparatus of claim 1, wherein the response message reception unit receives a polling message from one of the relay devices at time intervals.

5. The apparatus of claim 4, wherein the control message transmission unit transmits the control message generated by the control message generation unit to the relay device when the polling message is received.

6. An apparatus for controlling devices in one or more home networks, the apparatus comprising:
   a connection state detection unit which detects connection states of a plurality of devices connected through a network;
   an authentication unit which performs authentication with a control device which controls the devices;
   a message delivery unit which delivers messages transmitted and received between the control unit and the devices, and
   a message conversion unit which converts messages transmitted and received between the control device and the devices.

7. The apparatus of claim 6, wherein the authentication unit transmits an authentication request message to the control device and receives an authentication response message responding to the authentication request message.

8. The apparatus of claim 6, wherein the connection state detection unit transmits information about the connection states of the devices to the control device if the authentication has been performed.

9. The apparatus of claim 6, wherein the message delivery unit delivers the messages which are converted to the control device and the devices.

10. The apparatus of claim 6, wherein the message conversion unit converts the messages using a Universal Plug and Play (UPnP) Traversal method.

11. A method of controlling devices in one or more home networks, the method comprising:
   performing authentication with a plurality of relay devices connected to a plurality of devices through a network;
   generating a control message according to an input;
   transmitting the control message to a device selected from among the plurality of devices;
   receiving a response message responding to the control message; and
   managing information about the relay devices and the devices.

12. The method of claim 11, wherein the performing the authentication comprises:
   receiving an authentication request message from a relay device of the relay devices; and
   transmitting an authentication response message responding to the authentication request message to the relay device.

13. The method of claim 11, wherein the managing the information comprises generating a table which lists the devices connected to the relay devices for each of the relay devices.

14. The method of claim 11, wherein the receiving the response message comprises receiving a polling message from each of the relay devices at time intervals.

15. The method of claim 14, wherein the transmitting the control message comprises transmitting the control message to the relay device if the polling message is received.

16. A method of controlling devices in one or more home networks, the method comprising:
   detecting connection states of a plurality of devices connected through a network;
   performing authentication with a control device controlling the devices;
   delivering messages transmitted and received between the control unit and the devices, and
   converting messages transmitted and received between the control device and the devices.

17. The method of claim 16, wherein the performing the authentication comprises:
   transmitting an authentication request message to the control device; and
   receiving an authentication response message responding to the authentication request message.

18. The method of claim 16, wherein the detecting connection states comprises transmitting information about the connection states of the devices to the control device if the authentication has been performed.

19. The method of claim 16, wherein the delivering the messages comprises delivering the messages which are converted to the control device and the devices.

20. The method of claim 16, wherein the converting the messages comprises converting the messages using a Universal Plug and Play (UPnP) Traversal method.

21. The apparatus of claim 1, wherein a connection between the relay device and the plurality of devices is determined by detecting the addition or removal of a predetermined device of the plurality of devices.

22. The apparatus of claim 6, wherein the detecting of connection states comprises detecting the addition or removal of a predetermined device.

23. The method of claim 11, further comprising determining a connection between the relay device and the plurality of devices by detecting the addition or removal of a predetermined device of the plurality of devices.

24. The method of claim 16, wherein the detecting of connection states comprises detecting the addition or removal of a predetermined device.

* * * * *